United States Patent [19]
Van Benschoten

[11] Patent Number: 5,454,218
[45] Date of Patent: Oct. 3, 1995

[54] RAKE

[76] Inventor: Richard P. Van Benschoten, Jr., 345 E. 93rd St., Apt. 16G, New York, N.Y. 10128

[21] Appl. No.: 327,030

[22] Filed: Oct. 21, 1994

[51] Int. Cl.⁶ ....................................... A01D 7/00
[52] U.S. Cl. ................................ 56/400.17; 56/400.18; D8/13
[58] Field of Search ............................ 56/400.01, 400.17, 56/400.18; D8/13

[56] References Cited

U.S. PATENT DOCUMENTS

| | | | |
|---|---|---|---|
| D. 198,699 | 7/1964 | Hill et al. | |
| 31,113 | 1/1861 | Esterly. | |
| 567,364 | 8/1896 | Snyder. | |
| 654,645 | 7/1900 | Keiller | 56/400.01 |
| 966,602 | 8/1910 | Ross | 56/400.18 |
| 1,267,654 | 5/1918 | Gilson. | |
| 1,872,852 | 8/1932 | Van Nieuwenhuyzen. | |
| 2,056,411 | 10/1936 | Schulz | 56/400.01 |
| 2,321,489 | 6/1943 | Kaufman | 56/400.17 |
| 2,413,827 | 1/1947 | Herst | 56/400.17 |
| 2,456,876 | 12/1948 | Keller et al. | 56/400.17 |
| 2,479,877 | 8/1949 | Storm et al. | D8/13 X |
| 2,767,545 | 10/1956 | Jenkins | 56/400.18 X |
| 4,292,794 | 10/1981 | Gascon | 56/400.18 X |
| 4,312,095 | 1/1982 | Mullins | 56/400.14 |
| 4,406,113 | 9/1983 | Mullins | 56/400.14 |
| 4,791,780 | 12/1988 | Phillips | 56/400.04 |
| 4,996,834 | 3/1991 | Geist | 56/400.17 |

FOREIGN PATENT DOCUMENTS

| | | | |
|---|---|---|---|
| 878734 | 10/1961 | United Kingdom | 56/400.01 |

*Primary Examiner*—George A. Suchfield
*Attorney, Agent, or Firm*—Fish & Neave; Jeffrey H. Ingerman

[57] ABSTRACT

A rake having first and second raking fans attached to a handle is provided. The first fan defines a first tangent plane, and the second fan defines a second tangent plane which is preferably deflected out of the first plane by an angle of about 45°. In a preferred embodiment, the raking edge of the first fan is longer than the raking edge of the second fan so as to provide a large effective raking edge. Such a rake eliminates the disadvantage of the raking edge, or the leaves, passing over the user's feet during raking.

27 Claims, 5 Drawing Sheets

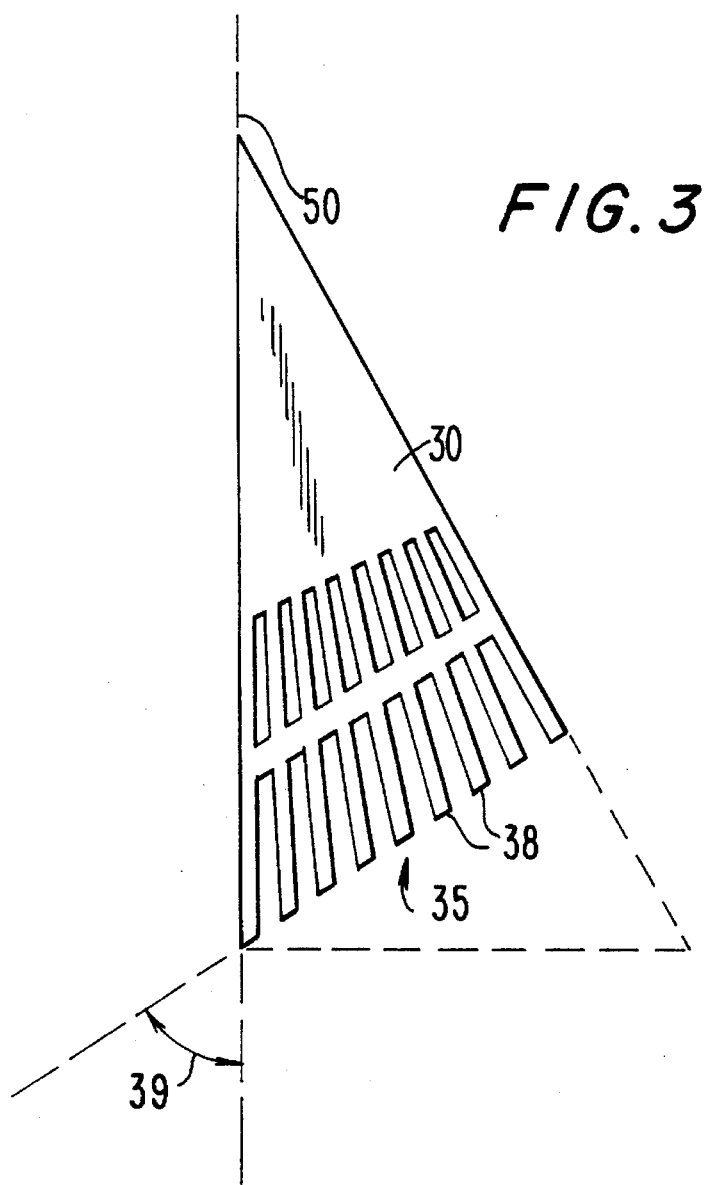
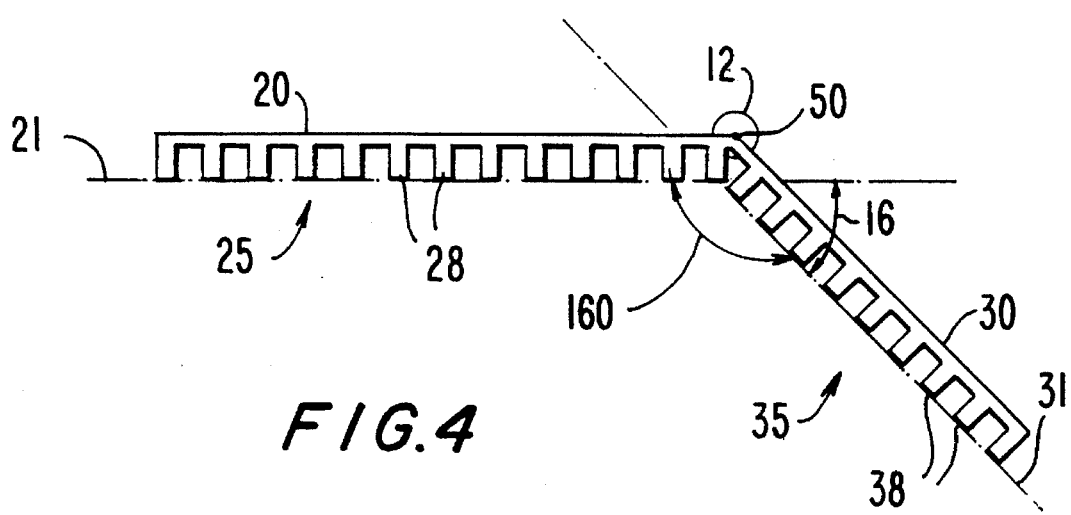

RAKE

BACKGROUND OF THE INVENTION

The present invention relates to lawn rakes, and more particularly to lawn rakes having a particular shape to control the movement of leaves.

Previously known rakes generally have a group of raking fingers which fan out to form a raking edge. The raking fingers usually extend from a support base which is fastened to a handle, or individual fingers may extend directly from a central point along the handle. The raking fingers may form a slightly arcuate surface, and the ends of the fingers themselves may form a slightly arcuate raking edge. However, flat rakes with straight raking edges are also known.

When raking leaves, it is advantageous to have a large raking edge so that a reasonably large amount of leaves may be moved by a single stroke of the rake. However, previously known rakes having a large raking edge suffer from certain disadvantages. For example, the raking fingers nearest the user may pass over the user's feet and deposit leaves and other debris on the user's feet and shoes. Secondly, even if the fingers themselves do not pass over the user's feet, leaves may spill out from the side of the rake onto the user's feet. Attempting to hold the rake further from the body while raking in order to overcome this problem may be tiresome and awkward.

Providing a smaller raking edge may remedy the problem of the raking fingers or leaves passing over the user's feet. However, this solution is not satisfactory because it also decreases the amount of material which may be moved by the rake in a single stroke, thereby forcing the user to make several passes with the rake.

In view of the these disadvantages, it would be desirable to provide a rake which allows a user to rake a relatively large amount of leaves in a single stroke without having the rake, or the leaves, pass over either of the user's feet.
Summary of the Invention It is therefore an object of the present invention to provide a rake which allows a user to rake a relatively large amount of leaves in a single stroke without having the rake, or the leaves, pass over either of the user's feet.

The above and other objects of the present invention are accomplished by providing a rake having first and second raking fans attached to a handle which defines a longitudinal axis. The first fan defines a first tangent plane which is tangent to the first fan substantially along a line at which the first fan meets the longitudinal axis. The second fan defines a second tangent plane which is tangent to the second fan substantially along a line at which the second fan meets the longitudinal axis. In accordance with the present invention, the second tangent plane is deflected out of the first tangent plane toward the user by a deflection angle between about 30° and about 0°. In a preferred embodiment, the deflection angle is about 45°. The raking edge of the first fan is preferably perpendicular to the handle of the rake. In a preferred embodiment, the raking edge of the first fan is longer than the raking edge of the second fan so as to provide a large effective raking edge. A rake constructed in accordance with the present invention thus provides the user an effective raking edge which is as large, or larger, than the raking edge of previously known rakes while eliminating the disadvantage of the rake passing over the user's feet. Furthermore, the second raking edge draws material, such as leaves, away from the user and toward the first raking edge during the raking stroke, rather than allowing the raked material to leak around the side of the second raking edge.

BRIEF DESCRIPTION OF THE DRAWINGS

The above and other objects and advantages of the present invention will be apparent upon consideration of the following detailed description, taken in conjunction with the accompanying drawings, in which like referenced characters refer to like parts throughout, and in which:

FIG. 3 is an elevational view of the second raking fan, taken from line 3—3 of FIG. 2;

FIG. 4 is a view along the axis of the handle of the rake, taken from line 4—4 of FIG. 1;

DETAILED DESCRIPTION OF THE INVENTION

In a preferred embodiment, the present invention provides a rake which allows a user to rake leaves from a location substantially in front of the user to a location adjacent the user without the raking fingers or leaves passing over the user's feet. The rake is shaped so that leaves are drawn away from the user during the raking stroke, rather than leaking around the side of the fan adjacent the user. A rake constructed in accordance with the present invention has a first and second fan attached to a handle. The second fan is preferably deflected out of the plane of the first fan in the direction of the bent tips of the fingers by an angle of about 45°. In order to provide a large effective raking edge, the length of the first raking edge is preferably greater than the length of the second raking edge. The raking edge of the second fan forms an acute angle with the axis of the handle such that when the handle is held at a predetermined use angle and the first raking edge is in contact with the ground, the second raking edge is also in contact with the ground.

Figure 1:
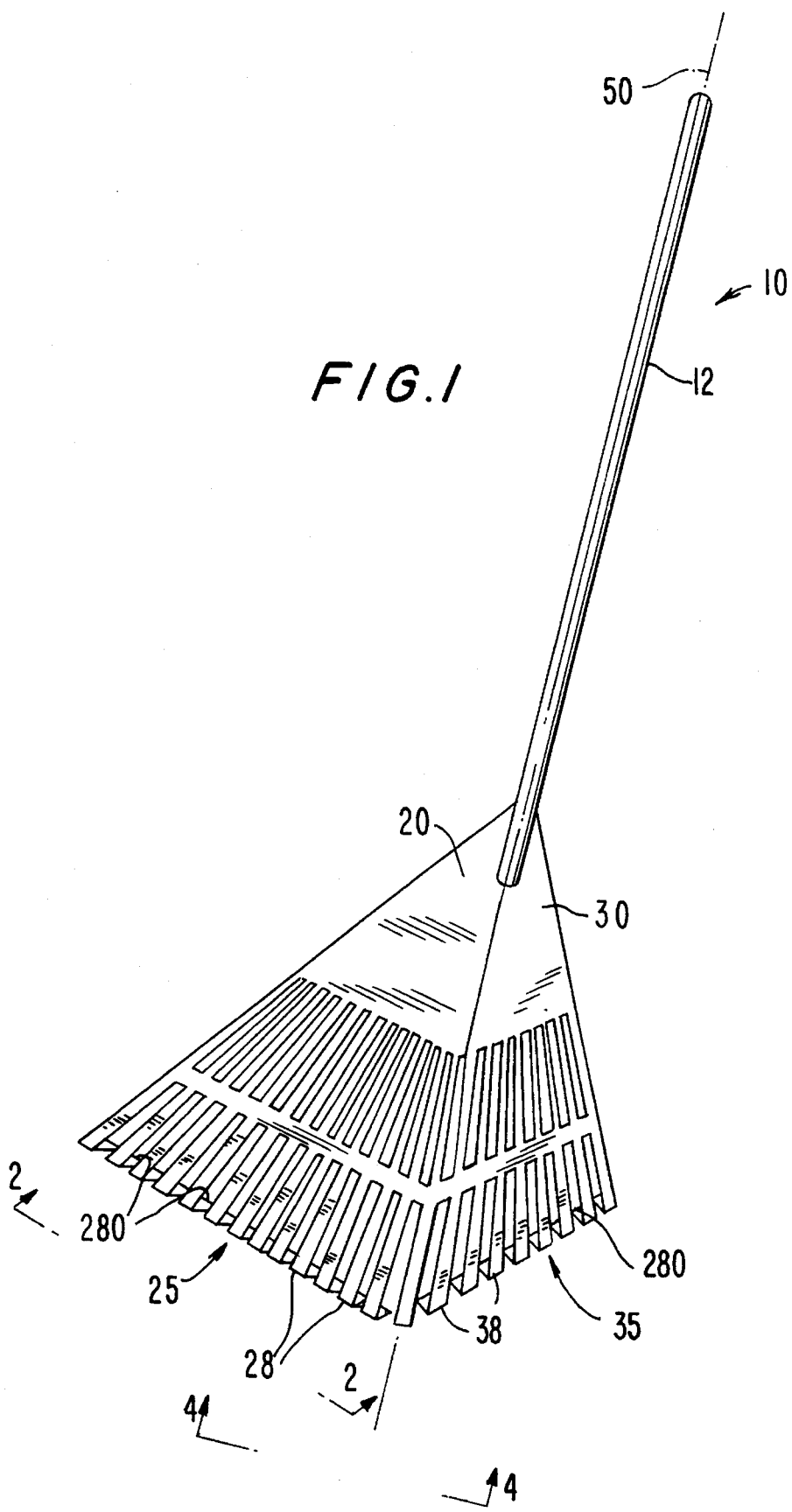
FIG. 1 is a perspective view of a first preferred embodiment of a rake constructed in accordance with the present invention.

A first preferred embodiment of a rake 10 constructed in accordance with the present invention is shown in FIG. 1. Fixedly attached to rake handle 12 are a first fan 20 and a second fan 30. First fan 20 has a first plurality of raking fingers 28 which form a first raking edge 25, while second fan 30 has a second plurality of raking fingers 38 which form a second raking edge 35. The tips 280 of raking fingers 28 and 38 are preferably bent to form an angle of about 90°, as is well known in rakes. As is also well known, fans 20 and 30, including raking fingers 28 and 38, may be made of, for example, plastic, metal, or other materials known for use in rakes. In addition, fans 20 and 30 may be formed as a single piece.

Referring to FIG. 4, it can be seen that first fan 20 and second fan 30 intersect to form external angle 16, representing the deflection of the second fan 30 out of the plane of first fan 20 in the direction of bent tips 280 of fingers 28 and 38. In accordance with the present invention, angle 16 is between about 30° and about 60°. In a preferred embodiment, angle 16 is about 45°. The first and second fans in this preferred embodiment thus form an internal angle 160 of about 135°.

In the embodiment of FIGS. 1–4, both first fan 20 and second fan 30 are substantially planar. However, in the second preferred embodiment of FIGS. 5 and 6, the first and second fans form arcuate surfaces. As described below in connection with that second embodiment, the first and second arcuate fans have respective first and second tangent planes. They can be used to define the deflection angle of the second fan relative to the first fan. In the embodiment of FIGS. 1–4, the tangent planes to the first and second fans are simply the fans themselves since they form substantially planar surfaces.

Figure 2:
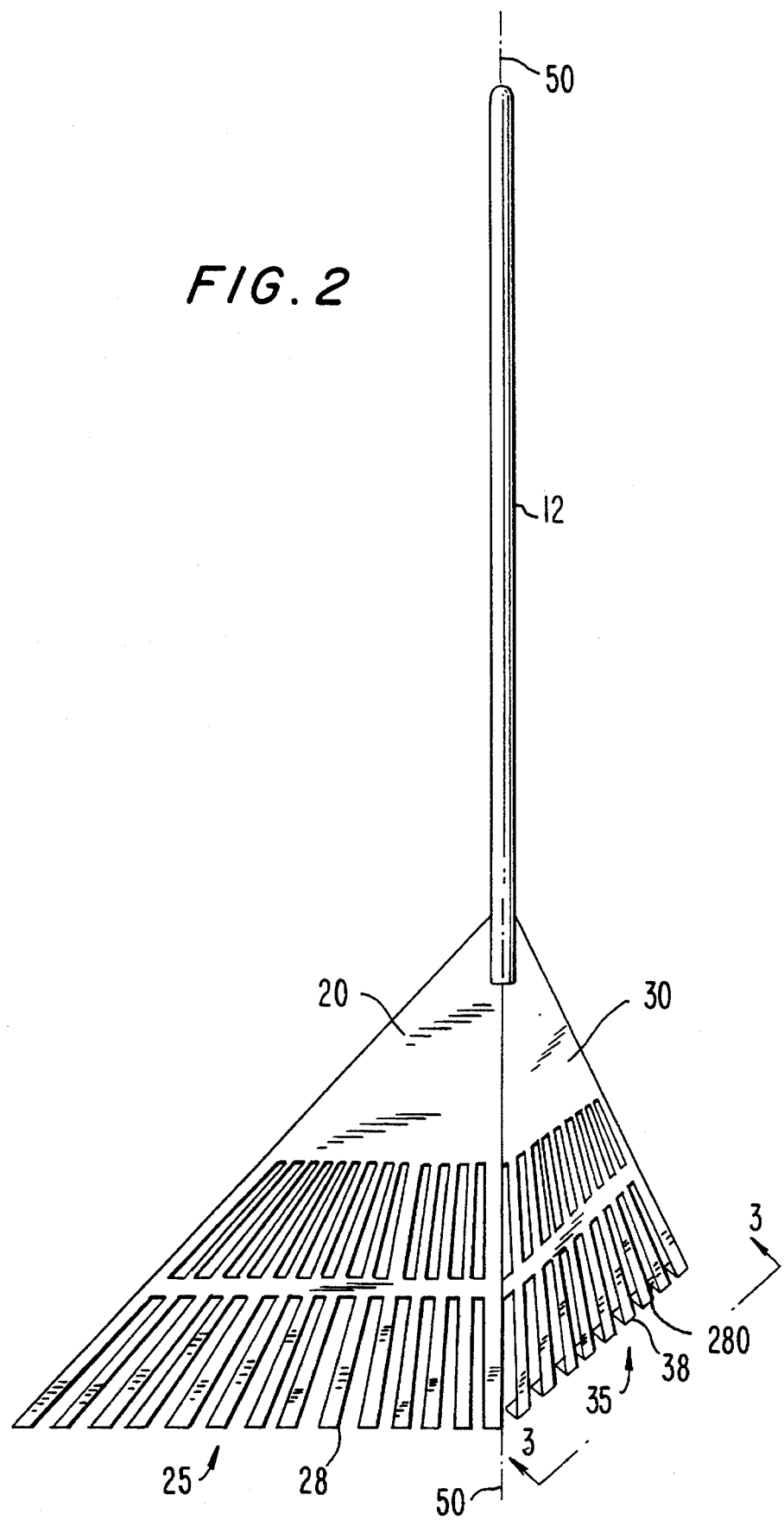
FIG. 2 is an elevational view of the rake shown in FIG. 1, taken from line 2—2 of FIG. 1.

As shown in FIG. 2, first raking edge 25 is substantially perpendicular to longitudinal axis 50 of handle 12. First raking edge 25 is thus similar to the raking edge of previously known rakes since previously known rakes generally have a single raking edge which is perpendicular to the handle of the rake. Referring to FIG. 3, in accordance with the present invention, second raking edge 35 forms an acute angle 39 with longitudinal axis 50. Angle 39 is chosen so that when the handle is held at a predetermined use angle and first raking edge 25 is substantially in contact with the ground, second raking edge 35 is also substantially in contact with the ground. The use angle is measured by rotating the handle about the axis formed by the ground and first raking edge 25 in a plane perpendicular to first raking edge 25. This assumes that the ground is substantially flat. A preferred use angle is between about 35° and about 55° degrees, and more preferably about 45°.

In a preferred embodiment in which the second fan is deflected out of the plane of the first fan by a deflection angle of about 45°, the following relationships hold for a rake constructed in accordance with the present invention. For a rake having a use angle also of about 45° angle 39 is chosen to be about 35°. In the case of a use angle of about 50°, angle 39 should be about 40° while in the case of a use angle of about 40°, angle 39 should be about 31°. For other angles, angle 39 can be calculated using trigonometric or linear algebraic techniques, or can be determined empirically.

Figure 5:
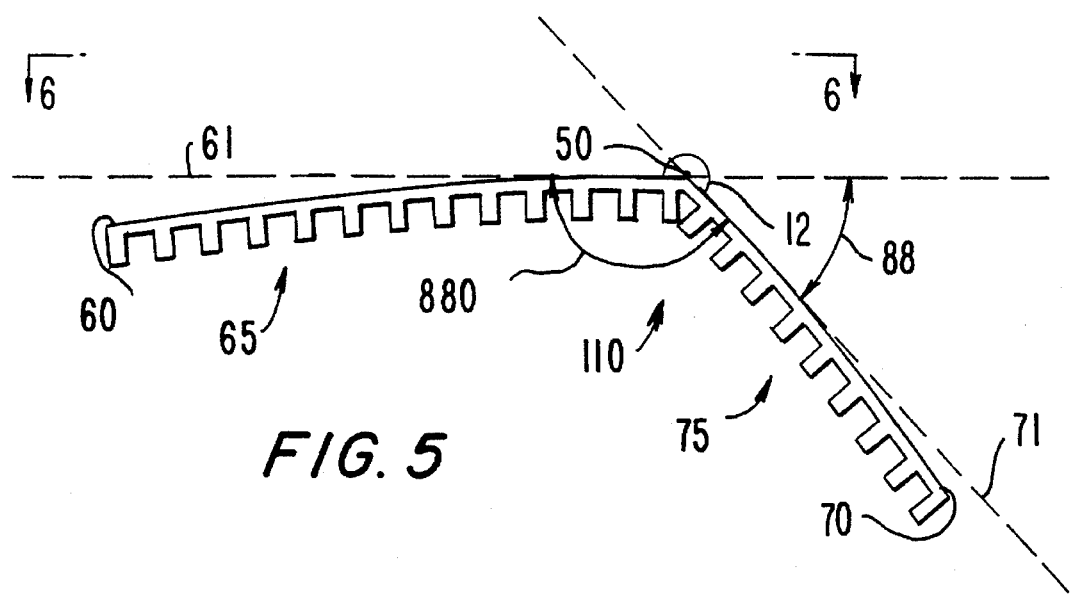
FIG. 5 is a view along the axis of the handle of a second preferred embodiment of a rake constructed in accordance with the present invention.
Figure 6:
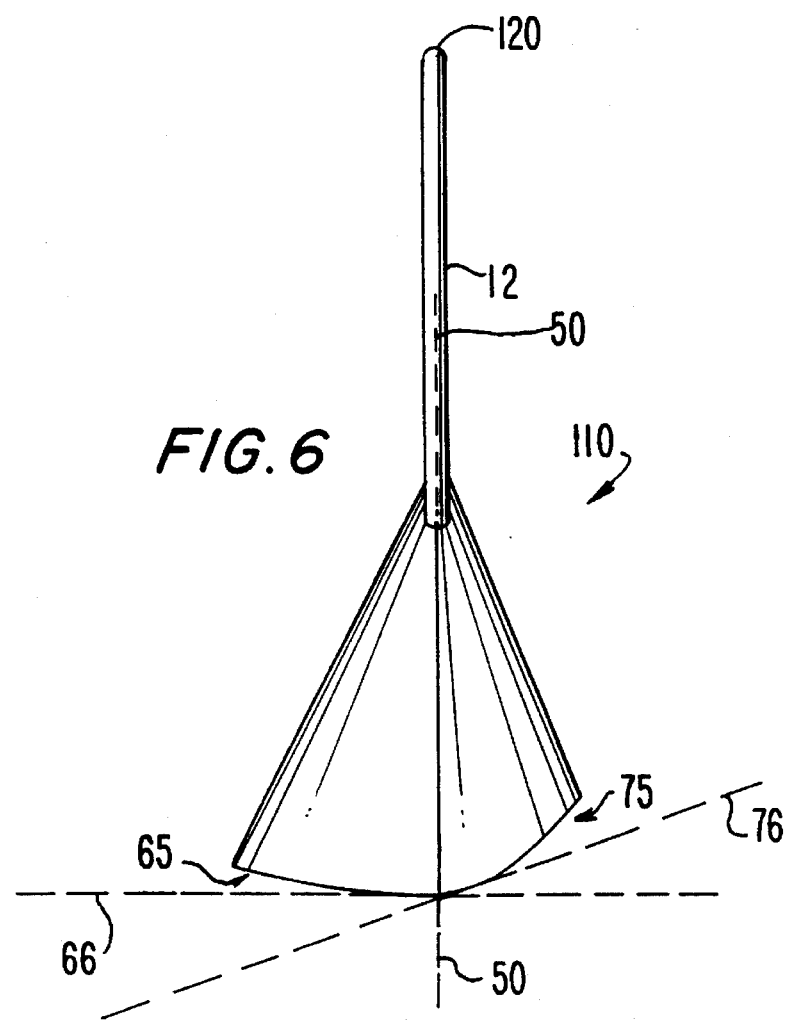
FIG. 6 is an elevational view of the rake of FIG. 5, taken from line 6—6 of FIG. 5.

In a second preferred embodiment 110 shown in FIGS. 5 and 6, first fan 60 and second fan 70 are slightly curved. As shown in FIG. 6, the first and second raking edges 65, 75 are also curved slightly toward the user's end 120 of handle 12 as they extend away from the longitudinal axis 50 of handle 12. First fan 60 and second fan 70 therefore form arcuate surfaces, and first raking edge 65 and second raking edge 75 form arcuate raking edges.

In order to determine the deflection angle of second fan 70 relative to first fan 60 it is useful to construct tangent planes to each of the fans. A first tangent plane 61 can be defined which is tangent to first fan 60 substantially along the line at which fan 60 meets longitudinal axis 50. A second tangent plane 71 can be defined substantially along the line at which fan 70 meets longitudinal axis 50. In accordance with the present invention, the intersection of first tangent plane 61 and second tangent plane 71 forms an external angle 88 which is between about 30° and about 60°, representing the deflection of second fan 70 relative to first fan 60. In a preferred embodiment, angle 88 is about 45°. Indeed, this is the same relationship as exists between the fans of rake 10 of FIGS. 1–4, where the first and second tangent planes are simply the first and second fans themselves.

Referring to FIG. 6, it can be seen that tangent lines can be constructed in a similar manner for each of raking edges 65 and 75. A first tangent line 66 can be formed which is tangent to first raking edge 65 substantially at a point on raking edge 65 where it intersects longitudinal axis 50. A second tangent line 76 can be formed which is tangent to second raking edge 75 substantially at a point on raking edge 75 where it intersects longitudinal axis 50. In accordance with the present invention, first tangent line 66 is substantially perpendicular to longitudinal axis 50, while second tangent line 76 forms an acute angle with longitudinal axis 50. In a preferred embodiment, tangent line 76 forms an angle of about 55° with longitudinal axis 50. Indeed, this is the same relationship as exists between the straight raking edges of FIGS. 1–4, where the first and second tangent lines are simply the first and second raking edges themselves.

Rake 10 of FIGS. 1–4 and rake 110 of FIGS. 5 and 6 are both constructed for raking material across the front of a user's body to a position adjacent the right-hand side of the user. Rakes 10 and 110 are thus "right-handed" rakes. A user looking down the handle of such a rake while the raking edges are resting on the ground will see first raking edge 25 extending to the right of the handle, and second raking edge 35 extending down and to the left. A "left-handed" rake can be made simply by interchanging fans 20 and 30 with the ends of the raking fingers bent in the direction of included angle 160, 880. In a left-handed rake, a user looking down the handle of the rake while the raking edges are resting on the ground will see the first raking edge extending to the left of the handle, and the second raking edge extending down and to the right.

In raking material such as leaves the user moves the rake in a direction which is perpendicular to first raking edge 25, 65, as though the first raking edge were one-half of a previously known rake. Due to the angle between the first and second raking edges, second raking edge 35, 75 is angled relative to the direction of raking motion. The effective raking length of the second raking edge is therefore reduced by a factor of the cosine of the angle between the first and second fans. In order to compensate for the effective length which is lost because of the angle between the first and second fans, the length of first raking edge 25, 65 is preferably longer than the length of second raking edge 35, 75 thereby increasing the effective length of the raking edge. The length of the first raking edge preferably exceeds that of the second raking edge by between about 25% and about 100%, and more preferably by about 50%.

A user using rake 10 to rake leaves from a location substantially in front of the user to a location adjacent to the right-hand side of the user finds that, due to the angle of second fan 35, leaves are raked without the raking fingers passing over the user's feet. Second fan 35 also pushes leaves in front of first fan 25 during the raking stroke rather than allowing the leaves to leak around the outer edge of second fan 35.

Figure 7A:
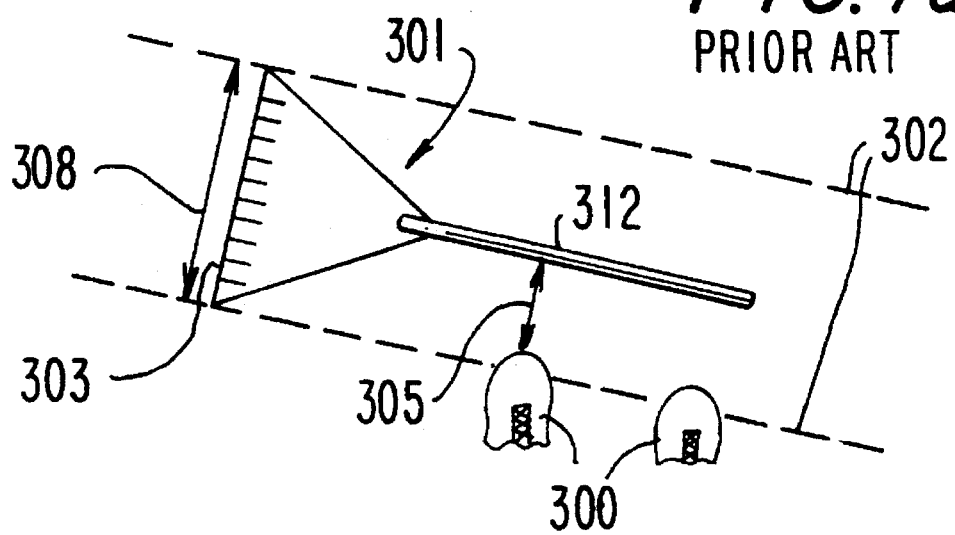
FIG. 7A is schematic diagram illustrating the use of a previously known rake.
Figure 7B:
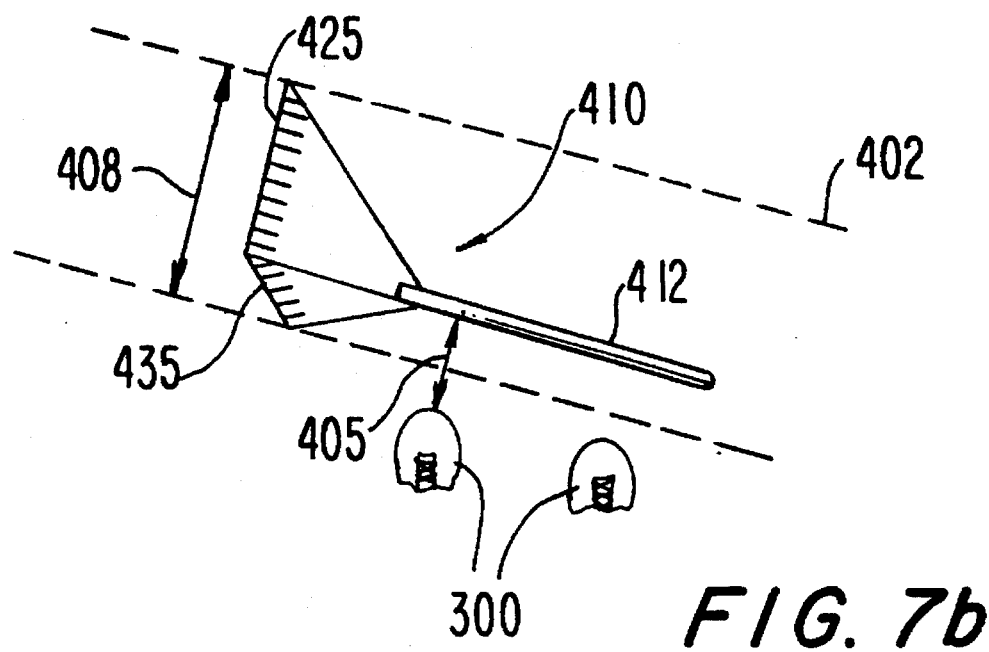
FIG. 7B is a schematic diagram illustrating the use of a rake constructed in accordance with the present invention.

A user using previously known rake 301 is shown in FIG. 7A. The user holds rake 301 at a distance 305 from his or her body and moves rake 301 along the path indicated by raking stroke boundaries 302. As can be seen, raking edge 303 passes over user's feet 300 during the raking stroke and may deposit leaves and other debris on the user's feet. As shown in FIG. 7B, a user using rake 410 constructed in accordance with the present invention, finds that raking edge 435 does not pass over the user's feet 300 as indicated by raking stroke boundaries 402. The raking stroke width 408, which is the effective combined length of raking edges 425 and 435 of rake 410, is substantially the same as the raking stroke width 308 of previously known rake 301. This is so even though raking edge 435 has a narrower effective raking length, because of the increased length of raking edge 425. Moreover, the distance 405 between the user and handle 412 of rake 410 is substantially the same as the distance 305 between the user and handle 312 of previously known rake 301, thus allowing the user to wield rake 410 with equal ease and comfort.

Thus, a rake which allows a user to rake lawns without having the raking fingers or the leaves pass over the user's feet has been described. One skilled in the art will appreciate that the present invention can be practiced by other than the described embodiments, which are presented for purposes of illustration and not of limitation, and the present invention is limited only by the claims which follow.

What is claimed is:

1. A rake comprising:

a handle having a longitudinal axis;

a first fan attached to said handle and having a first raking edge, said first fan defining a first tangent plane which is tangent to said first fan substantially along a line at which said first fan meets said longitudinal axis;

a second fan attached to said handle and having a second raking edge, said second fan defining a second tangent plane which is tangent to said second fan substantially along a line at which said second fan meets said longitudinal axis, said second tangent plane being deflected out of said first tangent plane by a deflection angle between about 30° and about 60° measured about said longitudinal axis.

2. The rake of claim 1 wherein said deflection angle is about 45°.

3. The rake of claim 1 wherein each of said first and second fans is substantially planar, said first and second tangent planes respectively coinciding substantially with said first and second fans.

4. The rake of claim 1 wherein each of said first and second fans forms an arcuate surface.

5. The rake of claim 1 wherein the length of said first raking edge is greater than the length of said second raking edge.

6. The rake of claim 5 wherein the length of said first raking edge exceeds the length of said second raking edge by between about 25% and about 100%.

7. The rake of claim 6 wherein the length of said first raking edge exceeds the length of said second raking edge by about 50%.

8. The rake of claim 6 wherein said deflection angle is about 45°.

9. The rake of claim 1 wherein said first raking edge defines a first tangent line which is tangent to said first raking edge substantially at a point on said first raking edge where said first raking edge intersects said longitudinal axis, said first tangent line being substantially perpendicular to said longitudinal axis; and wherein said second raking edge defines a second tangent line which is tangent to said second raking edge substantially at a point on said second raking edge where said second raking edge intersects said longitudinal axis, said second tangent line forming an acute angle with said longitudinal axis.

10. The rake of claim 9 wherein said first and second raking edges are substantially straight, and respectively coincide substantially with said first and second tangent lines.

11. The rake of claim 9 wherein said first and second raking edges are arcuate.

12. The rake of claim 9 wherein said acute angle is such that when a user holds said handle at a predetermined use angle and said first raking edge is substantially in contact with a substantially flat raking surface, said second raking edge is also substantially in contact with said raking surface.

13. The rake of claim 12 wherein said predetermined use angle is between about 35° and about.

14. The rake of claim 13 wherein said predetermined use angle is about 45°.

15. The rake of claim 14 wherein said deflection angle is about 45°.

16. The rake of claim 13 wherein said deflection angle is about 45°.

17. The rake of claim 9 wherein said deflection angle is about 45°.

18. The rake of claim 9 wherein the length of said first raking edge is greater than the length of said second raking edge.

19. The rake of claim 18 wherein the length of said first raking edge exceeds the length of said second raking edge by between about 25% and about 100%.

20. The rake of claim 19 wherein the length of said first caking edge exceeds the length of said second raking edge by about 50%.

21. A rake comprising:

a handle having a longitudinal axis;

a first fan attached to said handle and having a first raking edge of a first length, said first fan defining a first tangent plane which is tangent to said first fan substantially along a line at which said first fan meets said longitudinal axis, said first raking edge defining a first tangent line which is tangent to said first raking edge substantially at a point on said first raking edge where said first raking edge intersects said longitudinal axis, said first tangent line being substantially perpendicular to said longitudinal axis; and a second fan attached to said handle and having a second raking edge of a second length, said first length being greater than said second length, said second fan defining a second tangent plane which is tangent to said second fan substantially along a line at which said second fan meets said longitudinal axis, said second tangent plane being deflected out of said first tangent plane by a deflection angle of about 45°, said second raking edge defining a second tangent line which is tangent to said second raking edge substantially at a point on said second raking edge where said second raking edge intersects said longitudinal axis, said second tangent line forming an angle of approximately 55° with said longitudinal axis.

22. The rake of claim 21 wherein said first length exceeds said second length by between about 25% and about 100%.

23. The rake of claim 22 wherein said first length exceeds said second length by about 50%.

24. The rake of claim 21 wherein said first and second raking edges are straight, and respectively coincide substantially with said first and second tangent lines.

25. The rake of claim 21 wherein said first and second raking edges are arcuate.

26. The rake of claim 21 wherein each of said first and second fans forms an arcuate surface.

27. The rake of claim 21 wherein each of said first and second fans is substantially planar, said first and second tangent planes respectively coinciding substantially with said first and second fans.

* * * * *

UNITED STATES PATENT AND TRADEMARK OFFICE
CERTIFICATE OF CORRECTION

PATENT NO. : 5,454,218
DATED : October 3, 1995
INVENTOR(S) : Richard P. Van Benschoten, Jr.

It is certified that error appears in the above-indentified patent and that said Letters Patent is hereby corrected as shown below:

Column 1, line 56, "0°" should be -- 60° --.

Column 3, line 39, "45° angle" should be -- 45°, angle --.

Column 6, line 7, "about." should be -- about 55°. --.

Signed and Sealed this

Twenty-third Day of March, 1999

*Attest:*

*Attesting Officer*

Q. TODD DICKINSON

Acting Commissioner of Patents and Trademarks